United States Patent [19]

Dym

[11] B 3,921,165

[45] Nov. 18, 1975

[54] HIGH RESOLUTION GRAPHIC DATA TABLET

[75] Inventor: Herbert Dym, Mahopac, N.Y.

[73] Assignee: International Business Machines Corporation, Armonk, N.Y.

[22] Filed: Mar. 21, 1973

[21] Appl. No.: 343,577

[44] Published under the Trial Voluntary Protest Program on January 28, 1975 as document no. B 343,577.

[52] U.S. Cl. ..... 340/347 NT; 340/347 AD; 178/18; 178/19; 33/23 J

[51] Int. Cl.[2] .......................................... H03K 13/20

[58] Field of Search ....... 178/18, 19, 20; 340/347 P, 340/347 AD, 347 NT; 33/1 M, 23 J; 235/61.6 A

[56] References Cited

UNITED STATES PATENTS

| | | | |
|---|---|---|---|
| 2,630,481 | 3/1953 | Johnson | 340/347 P |
| 3,253,273 | 5/1966 | Allen et al. | 340/347 AD |
| 3,267,251 | 8/1966 | Anderson | 235/61.6 A |
| 3,342,935 | 9/1967 | Leifer et al. | 178/19 |
| 3,624,293 | 11/1971 | Baxter | 178/18 |
| 3,732,369 | 5/1973 | Cotter | 178/18 |

*Primary Examiner*—Charles D. Miller
*Attorney, Agent, or Firm*—Sughrue, Rothwell, Mion, Zinn & Macpeak

[57] ABSTRACT

A graphic data tablet of the type which includes at least one voltage divider element from which is developed signals indicative of position points along a coordinate direction. Position points along other coordinate directions are measured using other voltage divider elements. Each voltage divider element is sectionalized to permit the drive potential to be applied across a particular section or across the entire element. Position points are determined by first determining the section within which a position detecting pen is situated and subsequently the position of the pen within the section. Sectionalizing the tablet increases the tablet resolution. By providing overlapping sections, problems associated with nonlinearity at section boundaries are eliminated.

13 Claims, 18 Drawing Figures

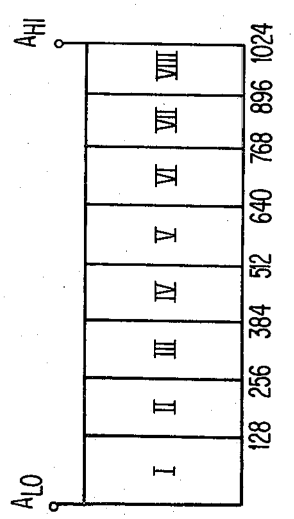
FIG. 14a
| SECTION | STATE OF STAGE 11,12 & 13 | | |
|---|---|---|---|
| I | 0 | 0 | 0 |
| II | 1 | 0 | 0 |
| III | 0 | 1 | 0 |
| IV | 1 | 1 | 0 |
| V | 0 | 0 | 1 |
| VI | 1 | 0 | 1 |
| VII | 0 | 1 | 1 |
| VIII | 1 | 1 | 1 |
FIG. 14b
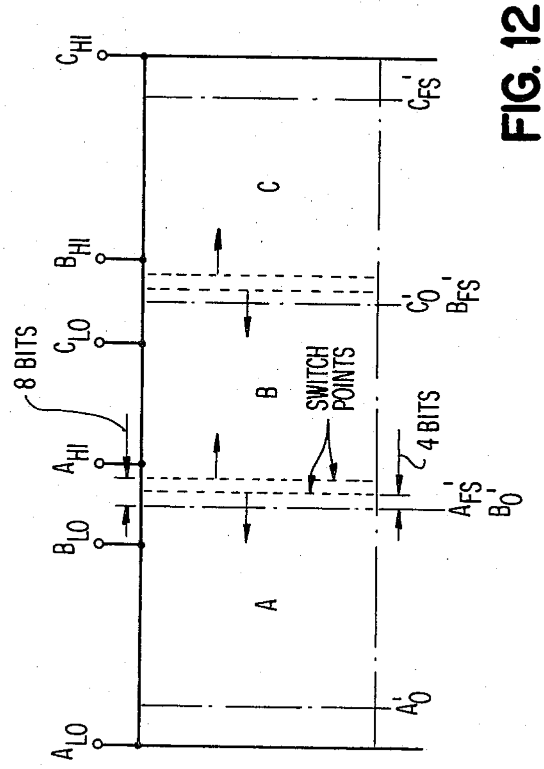
FIG. 12
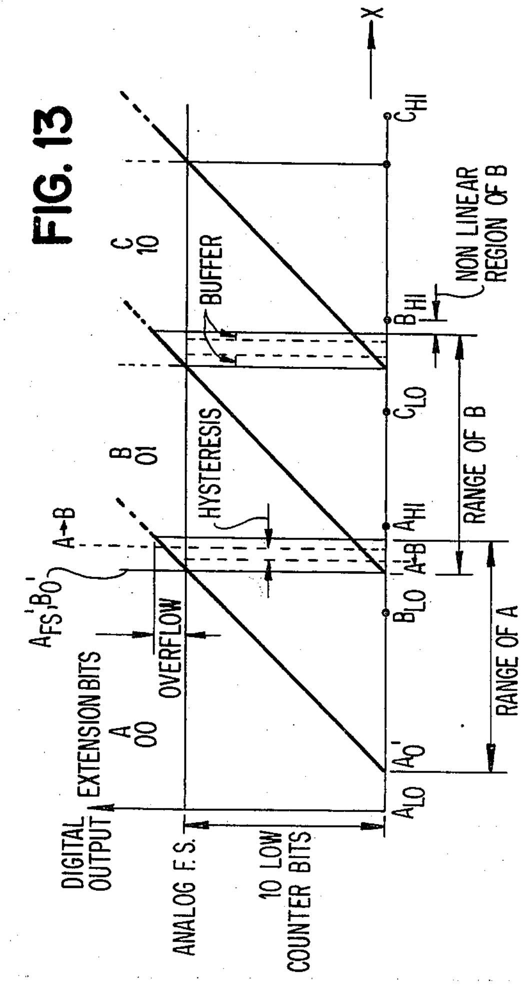
FIG. 13

HIGH RESOLUTION GRAPHIC DATA TABLET

BACKGROUND OF THE INVENTION

1. Field of the Invention

The invention is in the field of graphic data tablets and more specifically in the field of graphic data tablets providing a digital output indicative of position points on the tablet.

2. Brief Description of the Prior Art

Graphic data tablets can be broadly classified into analog and digital types. An example of an analog type graphic data tablet is described in the U.S. Pat. No. 3,466,646 to Lewin, issued Sept. 9, 1969.

Examples of the digital type graphic tablet are described in U.S. Pat. No. 3,647,963 to Bailey, issued Mar. 7, 1972; U.S. Pat. No. 3,632,874 to Malavard et al., issued Jan. 4, 1972; and U.S. Pat. No. 3,304,612 to Proctor et al., issued Feb. 21, 1967.

Conventional analog data tablets are generally constructed to include a voltage divider element, such as a linear resistor, for each coordinate direction, the voltage at a point along the element being indicative of the location of the point along the coordinate direction. To detect the voltage at any point on the tablet a voltage sensitive pen is employed. Capacitive or inductive pens are generally used. In such prior art systems, the tablet resolution is limited by the system electronics.

SUMMARY OF THE INVENTION

It is an object of the present invention to modify conventional graphic data tablets to increase the resolution for a given tablet size and to allow an increase in the size of the data tablet without decreasing the resolution and linearity thereof.

This is accomplished in accordance with the teachings of the present invention by dividing each voltage divider element of a graphic data tablet into sections, initially selecting the section in which the position detecting pen is located and subsequently position sensing within the selected section. Analog sensing is carried out within the section and the analog signal is subseuqently converted into a digital signal using a modified dual slope type analog-digital converter. To alleviate the problems associated with the nonlinearity at section boundaries, overlapping sections are provided.

The inventive tablet is operated in two modes. In the first mode, called herein "the searth mode," a drive potential is applied across the entire length of the voltage divider element, as is done in conventional data tablets. The search mode provides a digital indication of the section within which the pen designated point is located. Subsequently, the tablet is switched to a "Sectioned mode" of operation wherein the drive potential is applied across the section determined during the search mode. An analog signal proportional to the position of the probe within the section is developed which is subsequently converted intoi a digital signal and combined with the digital signal representing the section to produce a digital signal representative of the position of the pen designated point along one coordinate direction. If the pen position with respect to other coordinate directions is desired, the above procedure is repeated using other voltage divider elements, there being at least one voltage divider element associated with each coordinate direction.

BRIEF DESCRIPTION OF THE DRAWINGS

FIG. 12 illustrates an example of the layout of the three section one dimensional graphic data tablet formed in accordance with the teachings of the present invention;

FIG. 13 is a plot of the digital output signal of the tablet of FIG. 12 versus position;

FIGS. 14*a* and 14*b* illustrate the operation of the graphic data tablet of the invention during the search mode;

DETAILED DESCRIPTION OF THE PREFERRED EMBODIMENTS

Figures 1A, 1B, 2, 4:
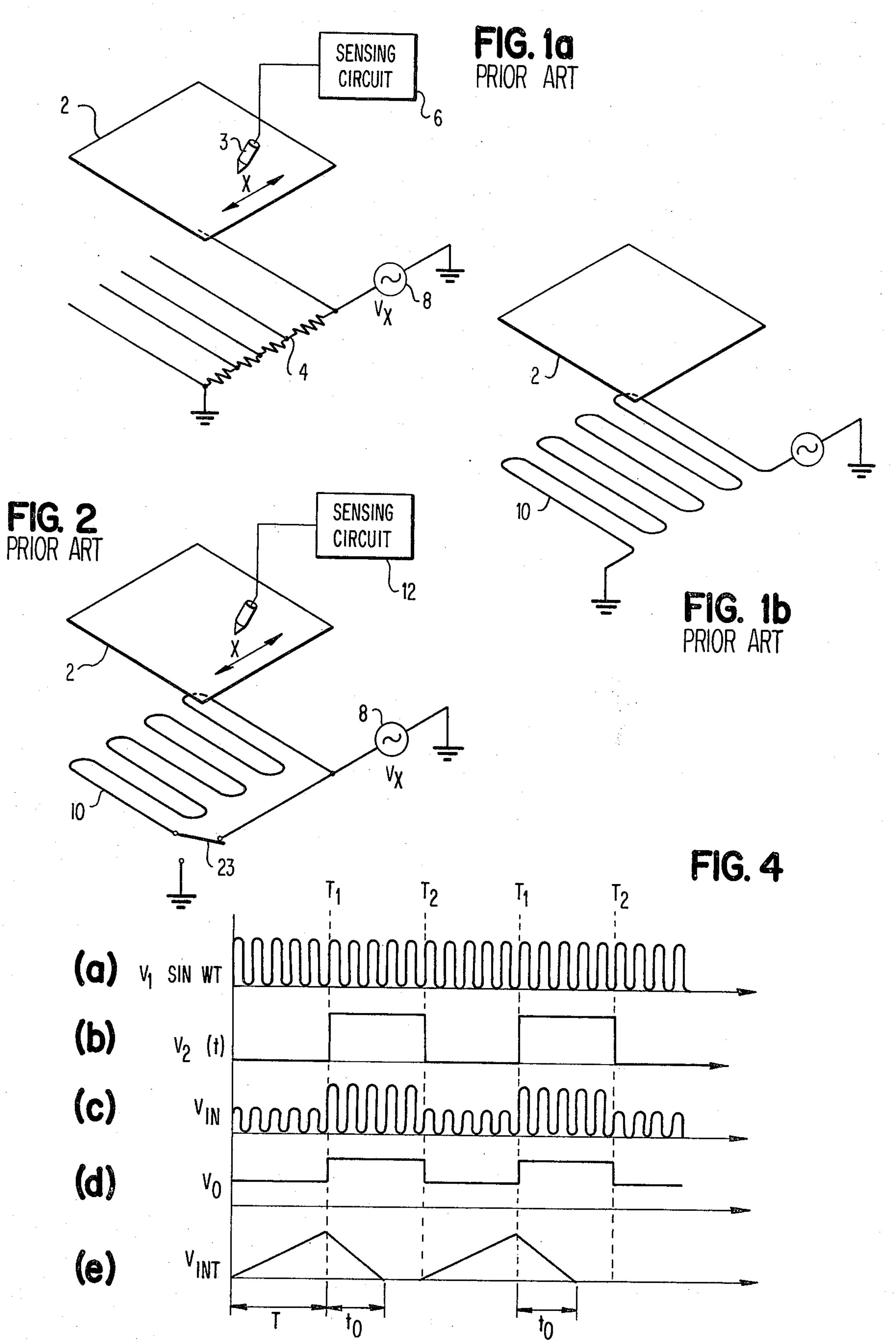
FIG. 1a PRIOR ART, FIG. 1b PRIOR ART, FIG. 2 PRIOR ART, FIG. 4
FIG. 1*a* represents a conventional one dimensional analog type graphic data tablet.
FIG. 1*b* represents an example of a voltage divider element which may be used with the tablet of FIG. 1*a*, as well as, the tablet of the present invention.
FIG. 2 illustrates the tablet of FIG. 1*a*, modified to produce a digital output signal.
FIG. 4 illustrates the waveforms at various selected points of the circuitry of FIG. 3.

In analog type graphic data tablets, position points along a coordinate direction are usually represented by an analog electrical value which is proportional to the position of a position detecting pen on the tablet. Referring to FIG. 1*a*, which illustrates a conventional one dimensional analog type graphic data tablet, the tablet is comprised of a plate 2 which may be of insulating material, overlying a voltage divider element 4, which may be a linear resistor, supplied with a drive signal from source 8. Position detecting pen 3 is coupled to a sensing circuit 6. When the pen 3 contacts or is over the plate 2, a potential proportional to the position along the X direction of the tablet is sensed and supplied to the sensing circuit 6. In an X–Y coordinate data tablet, a second voltage divider element (not shown) is positioned orthogonal to the element 4.

An example of a voltage divider element which may be used in such a graphic data tablet is illustrated in FIG. 1*b* and described in detail in copending patent application. Ser. No. 33,462 filed by Herbert Dym on Apr. 30, 1970 and which is now U.S. Pat. No. 3,668,313 issued June 6, 1972 and assigned to the same assignee as the instant invention.

FIG. 2 illustrates the data tablet of FIG. 1*a* modified to provide a digital output. Like elements in each of the Figures will be designated by a common numerical designator. FIG. 2 differs from FIG. 1*a* by the inclusion of the switch 23 and a modified sensing circuit 12 which includes a dual slope type analog-digital converter. A position measuring cycle consists of a sample period and a reference period. During the reference period the switch 23 is positioned as illustrated, being switched to its opposite position during the sample period. Details of the operation of such a digital data tablet are described in copending patent application Ser. No. 772,295 filed by Mazza on Oct. 31, 1968 and assigned to the same assignee as the instant invention and which is now U.S. Pat. No. 3,582,962 issued June 1, 1971.

Figure 3:
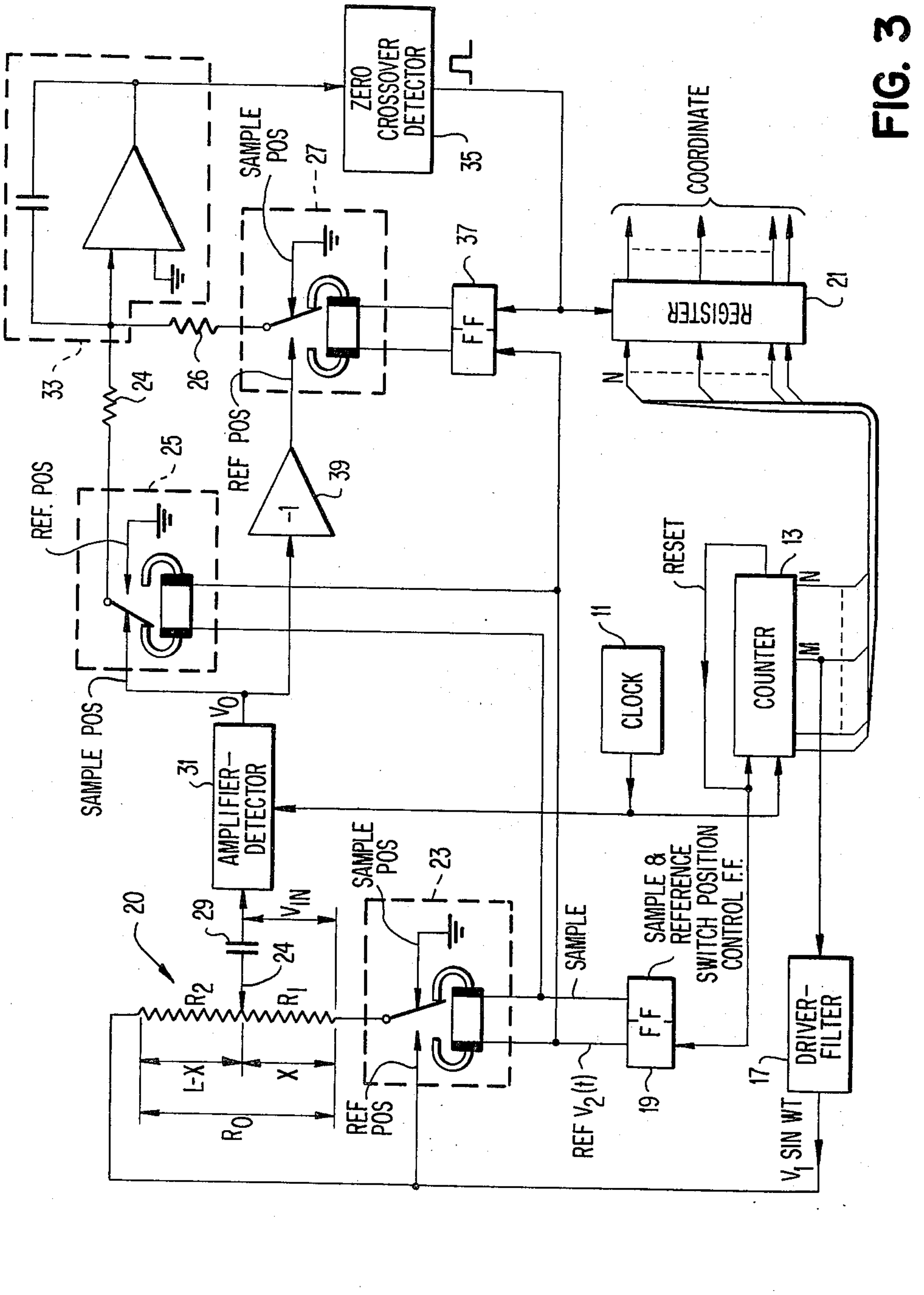
FIG. 3 illustrates the controlled circuitry of a conventional graphic data tablet producing a digital readout using a dual ramp type analog-digital converter.

In order to aid the reader in understanding the present invention, a brief description of the Mazza digital data tablet using a dual slope analog-digital converter will be given. FIG. 3, which corresponds to FIG. 1 of the above mentioned Mazza application, illustrates the control circuitry 12 of FIG. 2.

Switches 23, 25 and 27 are used to cause the tablet to switch from the sample period to the reference period. Capacitor 29 represents the coupling capacitance between the pen 3 and sensing surface 2 of FIG. 2 and is shown in FIG. 3 positioned between the pen represented by wiper 24 and the voltage divider represented by resistor 20. The potential detected by the wiper 24 is applied to the input of amplfier-detector 31 to produce an output waveform as illustrated in FIG. 4*d*. During the sample period, comprised of a fixed time period T, switch 25 is in the position shown and thus, the detector output signal is applied to the integrator 33 through resistor 24 which determines the integrator time constant. The output from the detector 31 causes the integrator 33 to charge to some value determined by the integrator time constant and the value of the detector output signal $V_0$ as illustrated in FIG. 4e.

During the reference period, switches 23, 25 and 27 switch to their respective reference positions whereby the detector output voltage $V_0$ is applied to the integrator 33 through inverter 39 and resistor 26 causing the integrator to discharge. The time $t_0$ required to discharge the integrator is proportional to the pen position with respect to the one coordinate direction under consideration. In the specific example under consideration, the coordinate direction is denoted as the X direction.

The reference voltage $V_2(t)$ produced by the switch position control flip-flop 19 is depicted by the plse waveform in FIG. 4*b*, while the resistor 20 drive potential $V_1 \operatorname{Sin}\omega t$ is shown in FIG. 4*a*. The input signal $V_{in}$ to the detector 31 during the reference and sample periods is shown in FIG. 4*c*.

Referring more specifically to the operation of the control circuitry of FIG. 3, during the sample period T, running from time $T_2 - T_1$, the reference side of the flip-flop 19 is at a logic 0, that is $V_2(t)$ is low, while the sample side of the flip-flop 19 is at a logic 1. This causes switches 25 and 27 to be in the positions illustrated. Thus, the voltage $V_{in}$ sensed by the wiper 24 is a function of both the wiper position, determined by the ratio $R_1/R_1 + R_2$ and the coupling capacitance. The sample period is controlled by the counter 13 and corresponds to the time it takes for the clock 11 to bring counter 13 to a full count after the counter has been reset. When counter 13 is full, a reset signal resets the counter and simultaneously toggles the flip-flop 19 placing the tablet control circuitry into the reference period.

During the reference period, since the switch 23 represents a negligible impedance, the signal $V_{in}$ corresponds to the drive signal $V_1 \operatorname{Sin}\omega t$. This is illustrated in FIGS. 4*a* and 4*c*. When the integrator waveform reaches zero, the zero crossing detector 35 output goes to a logic 1 causing the count in counter 13 to be loaded into register 21. The count in the counter 13 now corresponds to the time $t_0$ wherein the ratio $t_0/T$ is proportional to the ratio $R_1/R_1 + R_2$ which in turn is proportional to $X/L$.

With the graphic data tablet just described, the resolution, of the apparatus is limited by the system electronics. That is, the smallest position increment measurable with the system is determined by the smallest value of $V_{in}$ which can be detected. As the signal $V_{in}$ gets smaller, it tends to be masked by system noise.

The resolution of the data tablet previously described is increased in accordance with the teachings of the present invention by sectionalizing the voltage divider element shown as resistor 20 in FIG. 3 and applying the drive signal $V_1 \operatorname{Sin}\omega t$ to a selected section rather than across the entire resistor 20 in the manner shown in the prior art.

The concept behind the present invention may better be understood by considering the following. Let it be assumed that the minimum measureable voltage drop across the resistor 20 is 1 volt and that a 10 volt drive signal is applied across a 10 inch length of the resistor. Thus, this resistor can be resolved into 1 inch increments. However, if the 10 volt drive signal is applied across only 5 inches of the resistor, the resistor may be resolved into ½-inch increments, since each 1 volt drop now corresponds to one-half of an inch. Considering again the 10 inch length of resistance, if the 10 volt drive signal is initially impressed across one 5-inch length and then across the remaining 5-inch length of the resistor, the resistor can be resolved into ½-inch increments rather than 1 inch increments.

Figure 5:
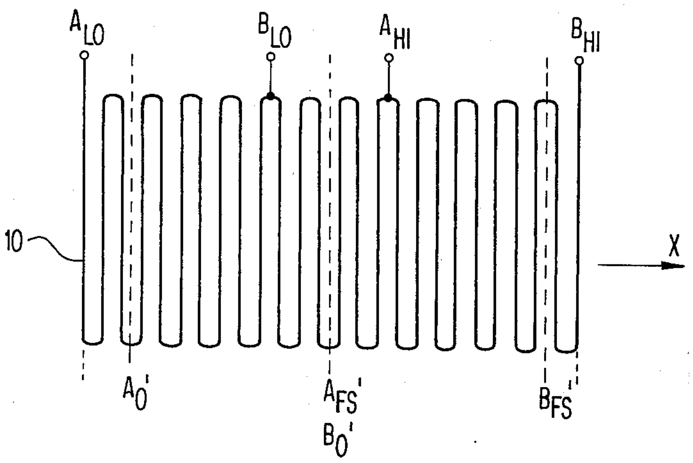
FIG. 5 illustrates a conventional voltage divider element for use in a graphic data tablet modified in accordance with the teachings of the present invention.

FIG. 5 illustrates a conventional resistive voltage divider element for use in graphic data tablets as shown in FIG. 1*b*, modified in accordance with the teachings of the present invention to provide a two section element. In conventional tablets, the drive signal $V_1 \operatorname{Sin}\omega t$ is applied across taps $A_{Lo}$ and $B_{Hi}$, taps $B_{Lo}$ and $A_{Hi}$ not appearing in the conventional element. In accordance with the teachings of the present invention, the voltage divider element 10 is provided with the series of taps which in the specific illustration divides the element 10 into two sections. A first section limited by taps $A_{Lo}$ and $A_{Hi}$ with the second section limited by the taps $B_{Lo}$ and $B_{Hi}$. The two sections are made to overlap to eliminate nonlinearities at the section boundaries.

Figure 6:
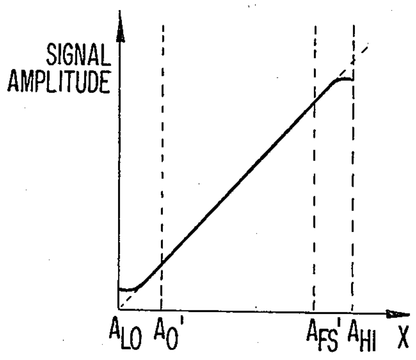
FIG. 6 is a plot of the voltage divider output signal as a function of position.

More specifically, if a drive signal is applied across one section, such as section A of element 10, the magnitude of the voltage $V_{in}$ versus position is shown in FIG. 6. As can be seen, nonlinearities exist at the low and high ends of the section. Specifically, a nonlinearity exists between the tap $A_{Lo}$ and some point $A_0'$, while a second nonlinearity exists between $A_{Hi}$ and another point $A_{FS}'$. Thus, correct position measurements can be made only in the linear region between the points $A_0'$ and $A_{FS}'$. This means, that for any section, the zero and full scale readings of the tablet must fall within the linear range. This requires a modification of the analog-digital converter so that it operates as illustrated in FIG. 7.

Figure 7:
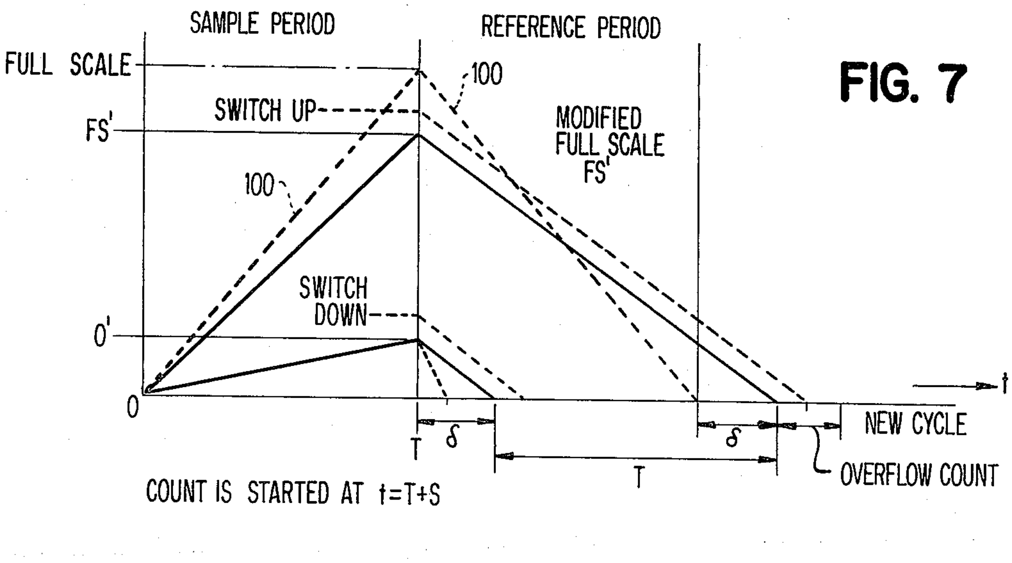
FIG. 7 illustrates the operation of the dual ramp analog-digital converter before and after modification in accordance with the teachings of the present invention.

FIG. 7 illustrates the waveforms generated by the dual ramp analog-digital converter operating in accordance with the teachings of the Mazza application and further, as modified in accordance with the teachings of the present invention. The dotted lines 100 of FIG. 7 illustrate the output of the integrator 33, prior to its modification as set forth hereinbelow, with, for example, the drive signal applied across one section, such as section A, with the position detecting pen at the high end of the tablet $A_{Hi}$ in the nonlinear region.

The modified zero and full scale amplitude points $A_0'$ and $A_{FS}'$ for section A and $B_0'$ and $B_{FS}'$ for section B, which defines the linear region of the sections, are determined experimentally from their physical locations on the tablet.

The apparatus must operate such that when the pen is positioned at the point $A_0'$, and section A has been energized, the tablet provides a zero reading and when the pen is at position $A_{FS}'$ the tablet provides a full scale reading T during the reference period. When the analog-digital converter is unmodified, the full scale reading T is provided only when the probe is at the point $A_{Hi}$ with the potential applied across the terminals $A_{Lo}$ and $A_{Hi}$ terminals. In order to modify the converter, the integrator time constant during the reference period must be increased until the zero crossing points occur at points $T + \delta$ and $2T + \delta$, when the pen is positioned at points $A_0'$ and $A_{FS}'$, respectively, whereby the time difference between the zero crossings, when the pen is respectively at points $A_0'$ and $A_{FS}'$ is T corresponding to a full scale reading. The time constant of the integrator during the reference period can be varied simply by varying the value of the resistor 26. The actual time value of $\delta$ is not significant, but once determined, the control logic is modified to cause the digital output counter 13, or its equivalent, as will be discussed below, to start counting at zero at time $T + \delta$. It should be realized, that without modification of the integrator time constant, the time difference between the zero crossings when the pen is at the new origin $A_0'$ and the new full scale point $A_{FS}'$ is less than the period T.

Figure 8:
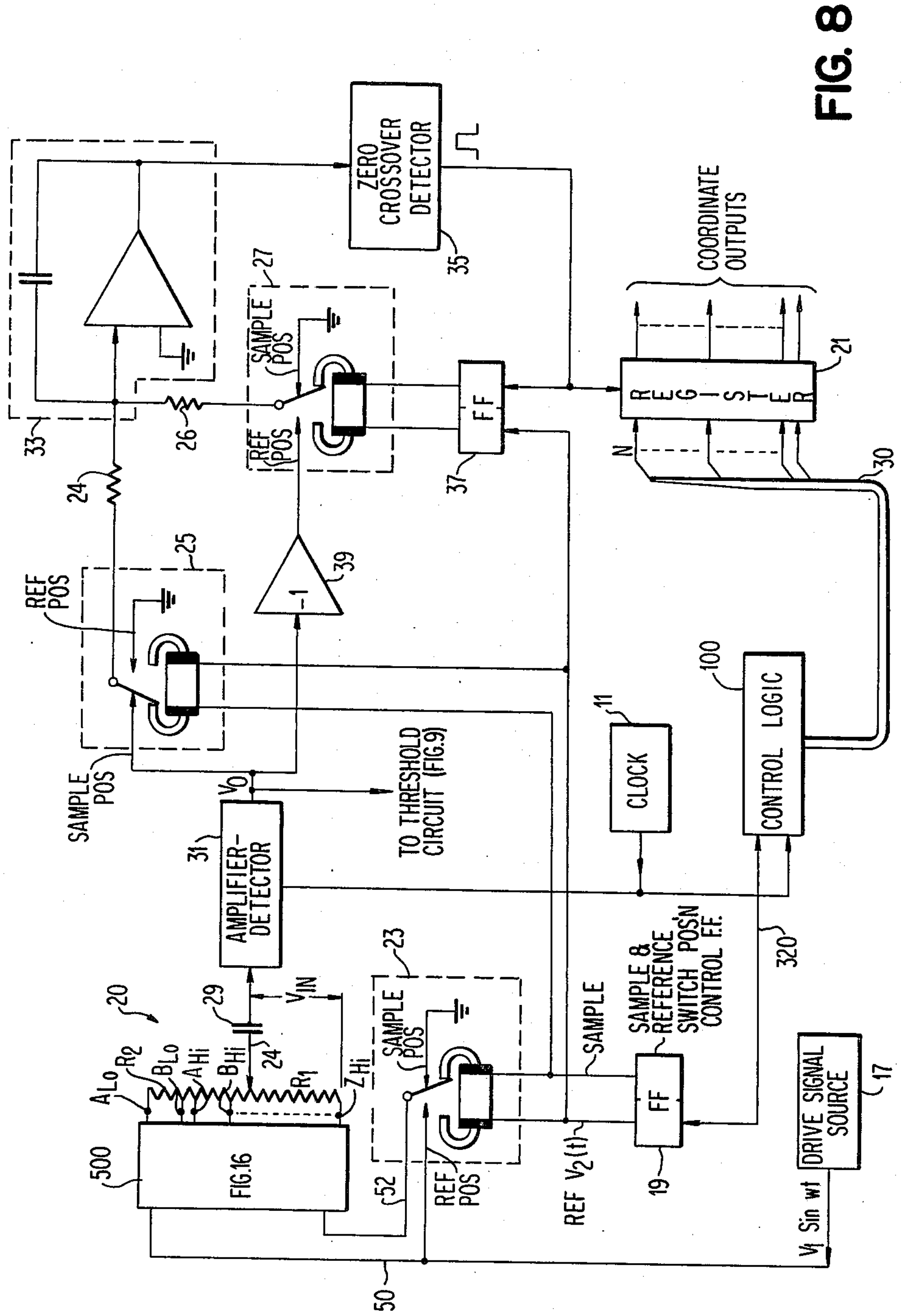
FIG. 8 illustrates the control circuitry of FIG. 3, modified in accordance with the teachings of the present invention.

FIG. 8 represents the conventional data tablet control circuitry of FIG. 3, modified in accordance with the teachings of the present invention. It is again noted, that like elements in each of the Figures are denoted by a common numerical designator. FIG. 8 differs from FIG. 3 in that the counter circuit 13 has been replaced by control logic 100 which is shown in detail in FIGS. 9 and 11, while resistor 20 is provided with a plurality of taps selectively coupled to lines 50 and 52 through section switches 500 illustrated in detail in FIG. 16. The operation of the circuitry of FIGS. 9 and 11 will now be described.

As previously indicated, the graphic data tablet is made to operate in two modes called the search mode and the sectioned mode. The details of the mode switching are described with reference to FIG. 11. At this point, it will suffice to understand that mode switching is donw automatically and is determined by the height of the pen 3 from the surface 2. Threshold logic is used to provide a logic 1 when the pen is low and a logic 0 when the pen is high.

Figure 9:
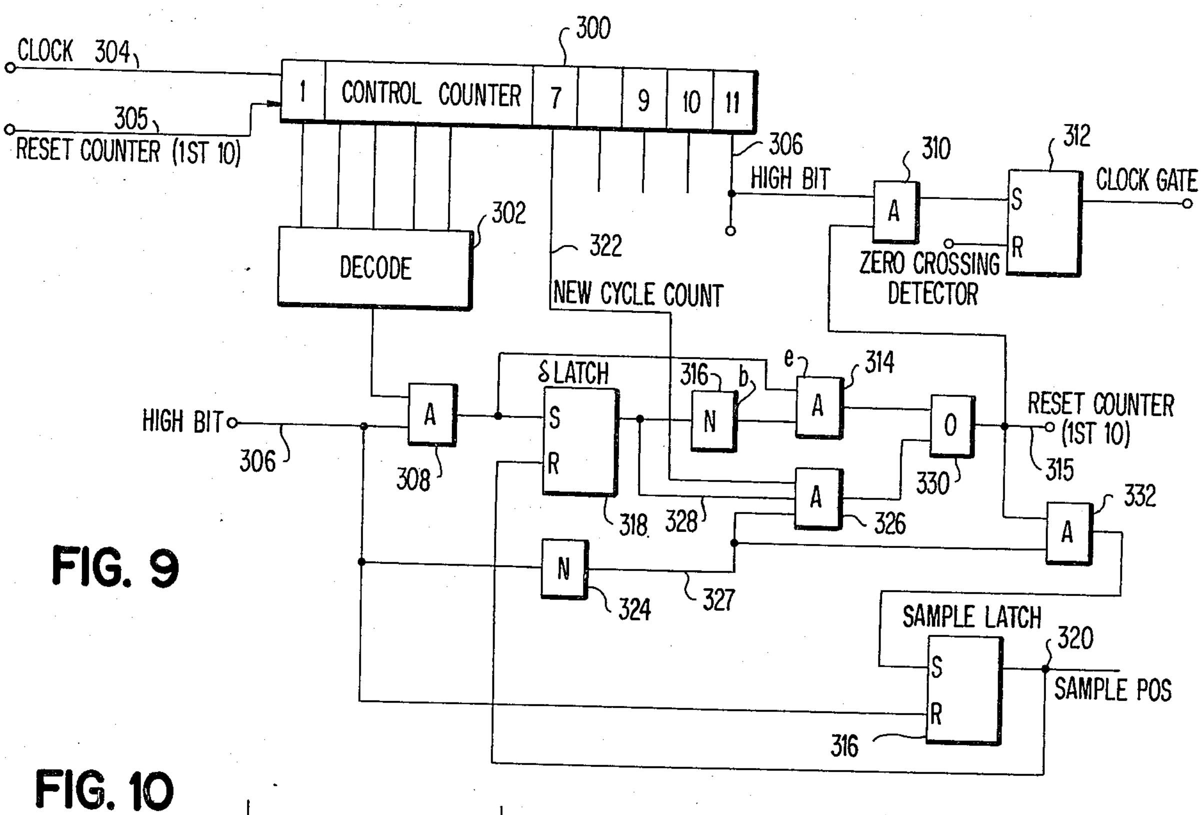
FIG. 9 illustrates the details of the cycle control circuitry of the invention.
Figure 10:
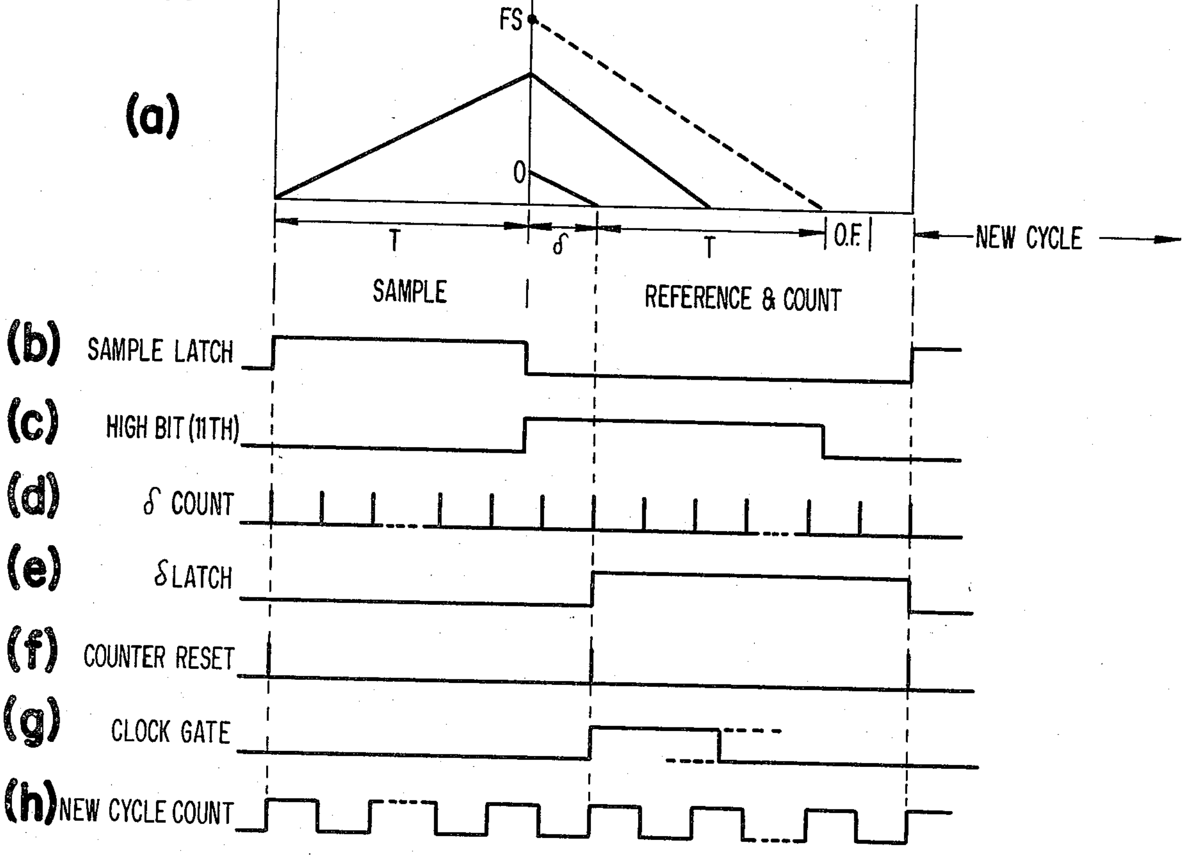
FIGS. 10*a* – 10*h* are plots of the waveforms at selected points of the circuitry of FIG. 9.

To control the duration of the sample and reference periods, there is provided the cycle control logic of FIG. 9. This circuitry operates continuously and independent of the pen position. The operation of FIG. 9 will be given with reference to the waveforms of FIG. 10. FIG. 10*a* represents the integrator 33 signal during the sample and reference periods. Counter 300 is incremented continuously by a clock signal on line 304 from clock 11. A sample time T is defined by a full count in the first 10 stages of the counter 300. The function of the eleventh stage will be described in greater detail below. It is to be noted at this point, however, that reset line 305 is connected only to the first ten stages of counter 300, and thus, will reset only these stages. Decoder 302 operates to detect a count corresponding to the time $\delta$, the derivation of which was previously described. In the example under consideration, it will be assumed that $\delta$ corresponds to a count of 32. However, as it will be realized by those having skill in the art, the time $\delta$ is not limited to a count of 32. Thus, every 32 clock pulses produce a logic 1 at the output of the decoder 302, as illustrated in FIG. 10*d*.

Regardless of whether the control circuitry is in the search mode or the sectioned mode, counter 300 must produce a sample and reference period. At the beginning of a measurement cycle which is comprised of a sample period followed by a reference period, counter 300 begins to increment and every 32 clock pulses results in a logic 1 at the output of decoder 302. However, since line 306 coupled to stage 11 is at this time at a logic 0, the output of the AND gate 308 remains at a logic 0. Counter 300 continues to count until the stages 1 – 10 thereof reach a full count at which time these stages return to zero, while stage 11 goes to a logic 1, indicating that the sample period T has expired and that the reference period should begin. This is illustrated in FIG. 10*c*. The beginning of a reference period is designated by a logic 1 on line 306 which enables AND gates 310 and 308. The first 10 stages of the counter 300 begin incrementing once again, but this time the first time a count of 32 is reached, the logic 1 produced at the output of the decoder 302 is passed by AND gate 308 to enable gate 314 and set $\delta$ latch 318. This is illustrated in FIG. 10*e*. When the latch 318 is set, gate 314 becomes disabled through the operation of the inverter 316. However, there is a short time delay between the enabling of the AND gate 314 and the setting of the latch 318 so that the output of the gate 314 momentarily assumes a logic 1, as illustrated in FIG. 10*f*, before it is disabled by inverter 316 after the latch 318 is set. This logic 1 pulse from the AND gate 314 is supplied to the reset line 315 causing the first ten stages of the counter 300 to reset to zero, while simultaneously passing the reset pulse through AND gate 310 enabled by the logic 1 in the 11th stage of the counter 300. The logic 1 at the output of the AND gate 310 sets latch 312 which starts the clock gate which activates the circuitry of FIG. 11. Since the counter 300 is reset during the reference period at the time $\delta$, all readings occur between the modified zero and the modified full scale points.

The states of the switches 23, 25 and 27 of FIG. 8 are controlled by the sample latch 316. At the beginning of a sample period the latch 316 is set. When the cycle control circuitry produces a reference period indication denoted by a logic 1 in stage 11 in counter 300, the latch 316 is reset causing line 320 to assume a logic 0 level, causing the switches 23, 25 and 27 to assume their reference positions. At this point in time, the integrator begins to discharge to develop a time value proportional to the position of the wiper 24. Counter 300 continues to count and when a zero crossing is detected by the zero crossing detector 35, latch 312 is reset to end the clock gate, which, as will be described with reference to FIG. 11, causes a measurement counter 203 to stop incrementing and to readout a count corresponding to the time $t_o$.

Even after the clock gate ends, counter 300 continues to count to its full count, thus causing stage 11 to revert to the logic 0 state. At this point the counter wraps around and once again begins to increment, providing an overflow period. This overflow time is selectable and the selection process is described hereinbelow.

In the specific example under consideration, the end of the overflow period is illustrated as occurring when a logic 1 appears on line 322 coupled to the seventh stage of counter 300. It should of course be realized, that line 322 may be coupled to other stages of the counter 300 depending upon the particular overflow period desired. Since at this point in time, stage 11 of counter 300 is at a logic 0, line 327 is at a logic 1 through the operation of the inverter 324, thus partially enabling AND gate 326. The δ latch 318 remains set and thus, line 328 is also at a logic 1. Thus, the first time that line 322 assumes a logic 1 after the eleventh stage of the counter 300 has toggled from a logic 1 to a logic 0, the output of the AND gate 326 goes to a logic 1, to generate a reset pulse which resets counter 300 while passing through the AND gate 332 enabled by the logic 1 on line 327 to set the sample latch 316 whereby line 320 goes to a logic 1. With line 320 at a logic 1, the switches 23, 25 and 27 are placed in their sample positions. In addition, a logic 1 on line 320 is fed to the reset input of the δ latch 318 to reset this latch. It can thus be seen, that the cycle control circuitry of FIG. 9 has now been initialized and is ready to start a new cycle beginning with a sample period.

The need for the overflow period will now be described. The overflow period is required for the overflow count which occurs in the counter 203 of FIG. 11 when the pen goes beyond the modified full scale point in any particular section. It is in this overflow region that the switch up to the next upper section takes place. The overflow region is used to allow smooth error free switching between sections. No error must be permitted in switching sections even when the pen is moving fast, except for that caused by the normal limitations of the conversion sample rate. The way in which this is achieved can best be described by a specific example. The logic can be designed so that switching occurs at the end of the cycle where an overflow of eight or more is detected. The magnitude of the overflow is equal to the amount above zero of the next higher section. When switching into a section from the one above, the switch down point could be at a count of four or lower. Thus, at high pen speeds, as many as four coordinate points could be skipped between samples and the proper position would still be determined during the cycle in which the need to switch is detected. The region between the switch points is a hysteresis band which, in this case, is three counts wide. A hysteresis of at least one is required to provide a stable position between switch points.

FIG. 12 is a layout of a portion of a tablet surface showing where specific conditions physically exist. FIG. 13 is a representation of the digital output of a counter 203 as a function of position. The operation of the counter 203 to develop the plot of FIG. 13 will be described with reference to FIG. 11.

Figure 11:
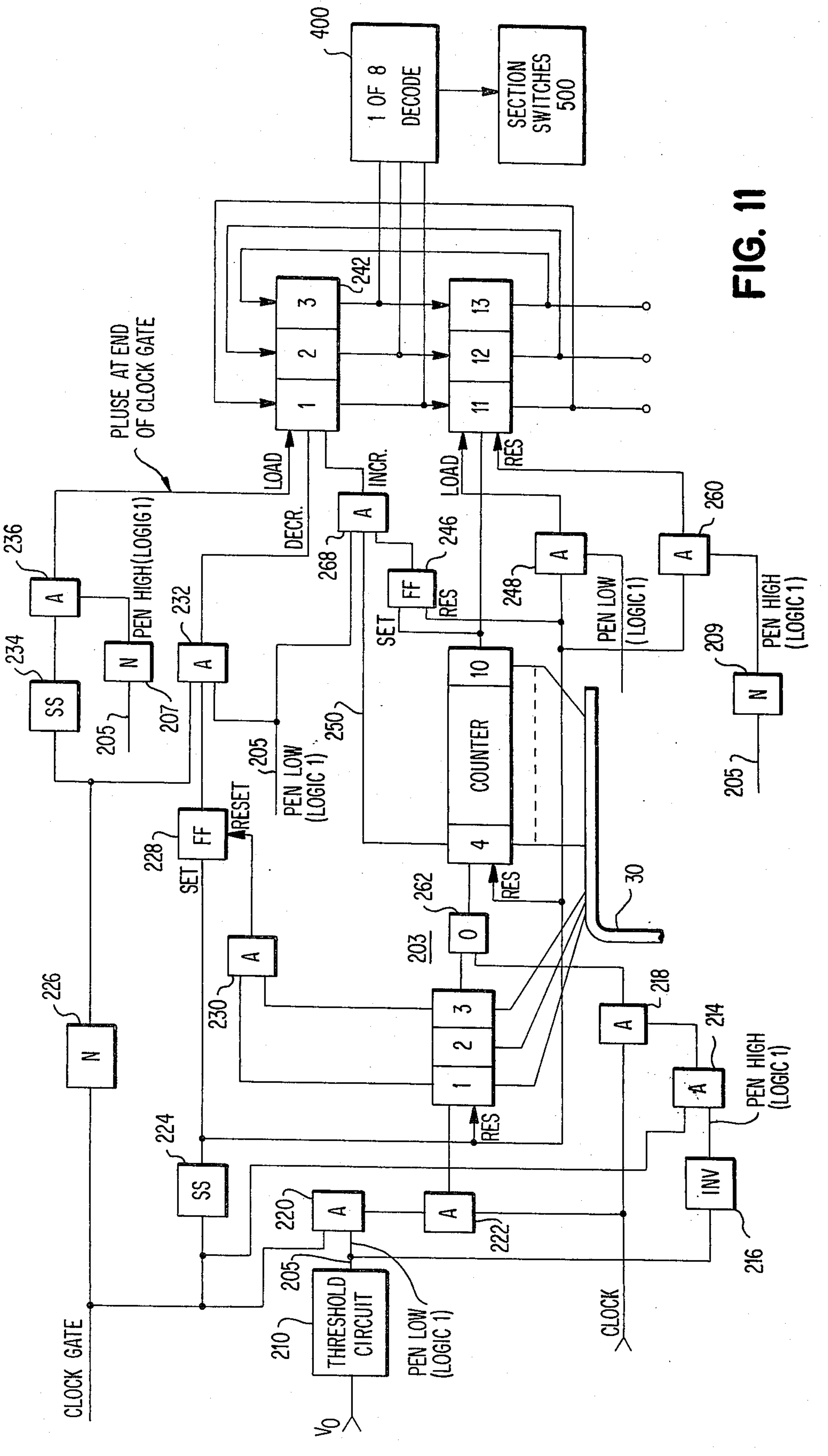
FIG. 11 illustrates the details of the section control logic of the control circuitry of FIG. 8.

Referring now to FIG. 11, the operating mode of the tablet is controlled by the pen height in a conventional manner. Since the signal strength at the output of the pen 3 is proportional to the height of the pen from the tablet surface 2, mode switching can be effected through the use of a conventional threshold circuit 210.

With the pen high off of the surface of the tablet 2, the output of the threshold circuit 210, on line 205, is at a logic 0, which automatically places the section control logic of FIG. 11 in its search mode of operation. The operation of the section control logic during the search mode will now be described.

At the start of a clock gate, produced by the circuitry of FIG. 9, the single shot 224 is fired to reset the counter 203 comprised of 13 stages, only 10 of which will be used in any mode of operation. During the search mode of operation stages 4–13 of the counter 203 will be used, while stages 1–3 will be disregarded. During the sectioned mode of operation, only stages 1–10 will be used, while stages 11–13 will store a count corresponding to the section in which the pen register is located.

With the pen high, the AND gate 214 is enabled through the inverter 216. Thus, the clock gate passes through the gate 214 to enable gate 218 to pass clock pulses to stages 4–13 of the counter 203 through the OR gate 262.

It should be remembered at this point, that a clock gate exists only during the reference period of a measuring cycle. During the reference period, stages 4–13 of the counter 203 increments until a zero crossing is detected by the zero crossing detector 35 at which point the clock gate ends.

As illustrated in FIGS. **14*a* and 14*b*, the contents of stages 11–13 at the end of the clock gate define one out of eight sections. If all three stages 11–13 contain zeros, section I is designated. If stage 11 has a logic 1 therein which represents a count between 128 and 256, then section II is designated and so on, as illustrated in FIG. 14*b*.**

At the end of the clock gate, the output of the inverter 226 goes to a logic 1 firing the single shot 234 causing a pulse to pass through the AND gate 236 which has been enabled by a logic 1 at the output of the inverter 207, occurring when the pen is high. The signal at the output of the gate 236 is applied to the load input of the register 242, causing the contents of stages 11–13 of counter 203 to be loaded into the register 242. The register 242 is connected to the 1 of 8 decoder 400 which provides a section selection signal to the section switches 500. An example of a decoder which may be used is illustrated in FIG. 15, while the details of the section switches 500 are illustrated in FIG. 16.

Figure 15:
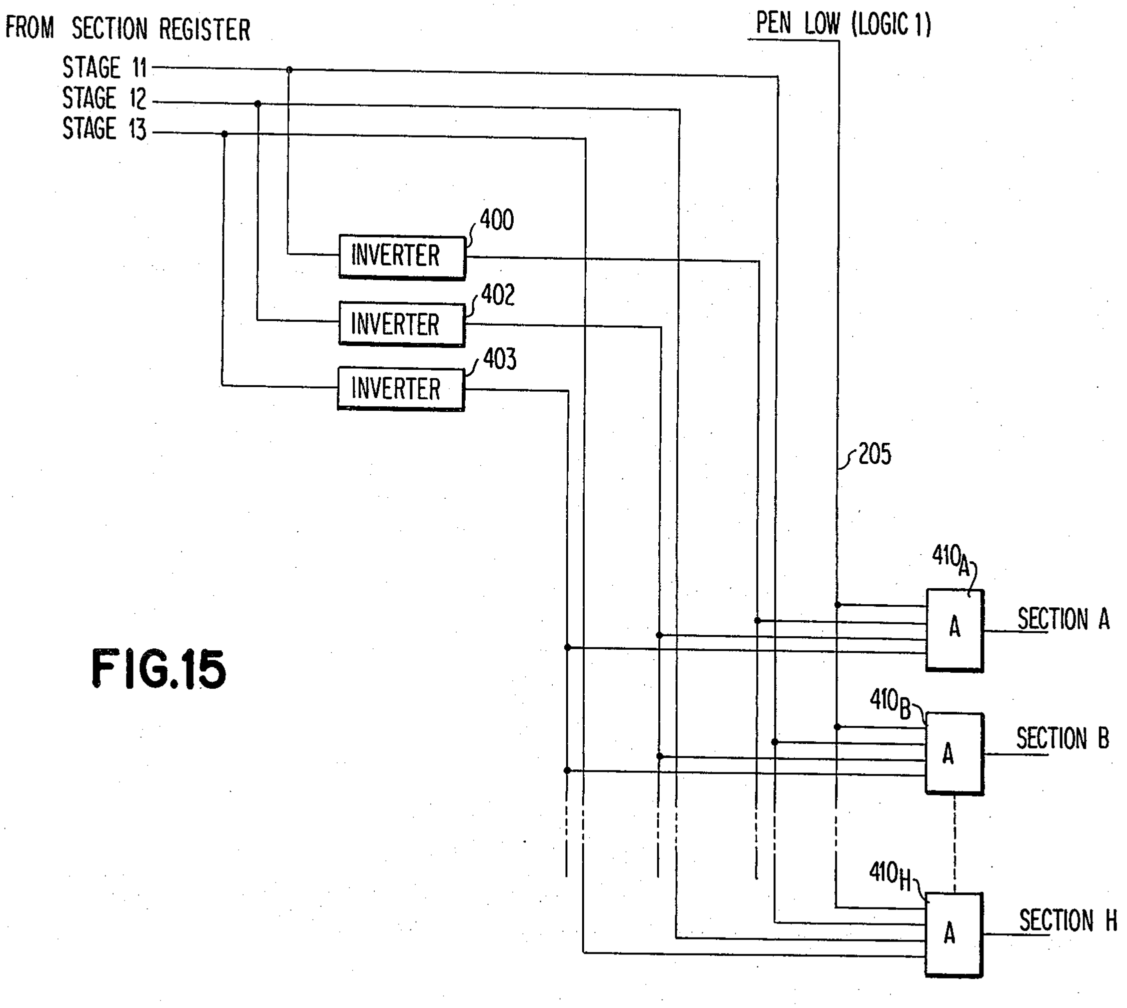
FIG. 15 illustrates the details of the decoder.

Looking now to FIG. 15, for an eight section tablet, the decoder 400 is comprised of inverters 400, 402 and 404 and AND gates $\mathbf{410}_A \ldots \mathbf{410}_H$. One input to each of the AND gates $\mathbf{410}_A \ldots \mathbf{410}_H$ is from the line 205 coupled to the output of the threshold circuit 210. Thus, when the pen is high, all of the AND gates are disabled and no section designating signal is generated. However, as soon as the pen goes low, as it travels towards the surface 2 of the data tablet, line 205 goes to a logic 1 thereby enabling the gates $\mathbf{410}_A \ldots \mathbf{410}_H$ to produce a section designating signal applied to the section switches 500.

Figure 16:
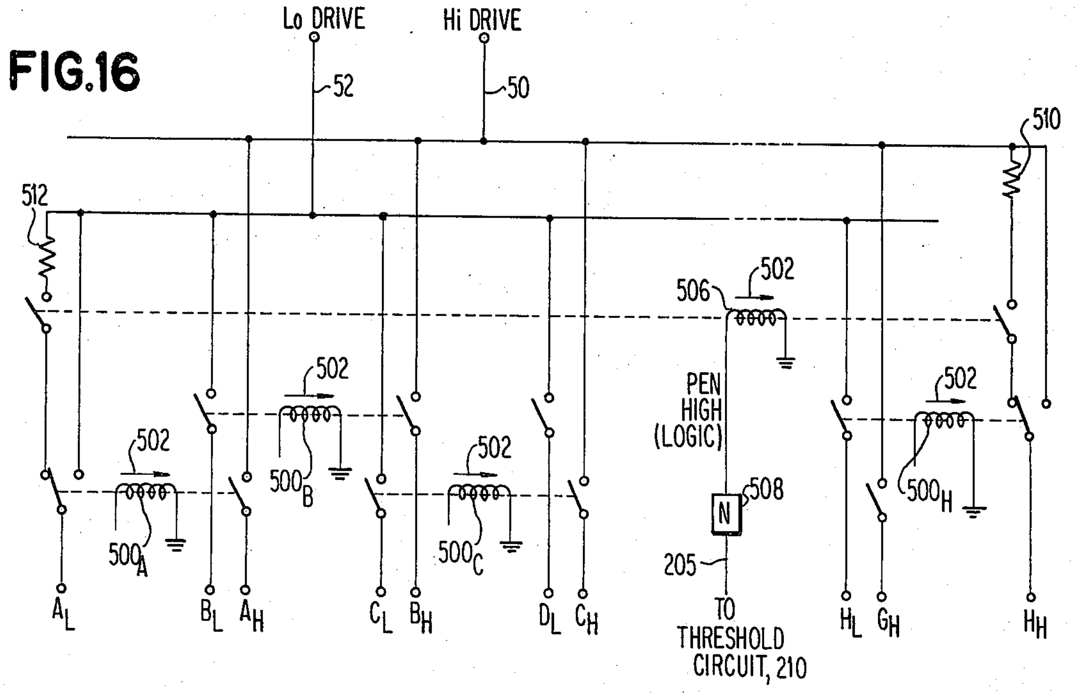
FIG. 16 illustrates the details of the section switches.

Referring more specifically to FIG. 16, when the line 205 is at a logic 0 representing the pen high condition, the relay 506 is energized closing its corresponding switches to thereby apply the drive signal across the entire resistor 20. As soon as the pen reaches its low position, the relay 506 becomes disabled and one of the relays $500_A$ . . . $500_H$ becomes energized in accordance with the output signal from the decoder. Let it be assumed that the output from the gate $410_A$ goes to a logic 1 thereby energizing relay $500_A$. This causes the switches associated with relay $500_A$ to move in a direction of the arrow 502 to thereby place the drive signal across $A_{Lo}$ and $A_{Hi}$ of section A only.

With the pen in the low position, the tablet is in the sectioned mode of operation designated by a logic high at the output of the threshold circuit 210. At the start of the clock gate of the measuring cycle, which represents the start of the reference period, the counter 203 is reset and begins to increment as the integrator 33 discharges towards zero. Since the AND gate 222 is now enabled, while AND gate 218 is disabled, clock pulses from the clock 11 are applied to the first ten stages of the counter 203. Assuming that the pen is within the section designated by the state of the register 242, and more specifically within the linear range of that section, the counter 203 does not reach a full count before the clock gate is terminated. It will be remembered, that if in a specific example, an overflow count of eight or more is generated during the reference period or if counter 203 presents a count of less than four, switching to the next higher or lower section, respectively, must occur. To accomplish this switching, the output of the single shot 224 is coupled to the set terminal of the flip-flop 228. If the first three stages of counter 203 cannot reach a count of four or more during the reference period, flip-flop 228 remains set at the end of the clock gate, and thus partially enables the AND 232. The gate 232 is fully enabled by the logic 1 on line 205. Thus, at the end of a clock gate the output of inverter 226 assumes a logic 1 which is passed through the AND gate 232 to the decrease instruction input of the register 242 causing the contents of the register to be decremented by a count of one, thereby designating the next lower section. In response to the decrementing of the register 242, the output of the decoder 400 changes to cause the section switches to switch to the next lower section. At the start of the next reference period, the contents of the register 242 are loaded into the counter of the stages 11–13 of the counter 203.

If the pen moves at least eight counts past the modified full scale point, the tablet must be switched to the next higher section. The switchup sequence is as follows.

Since the pen has passed the modified full scale point of the energized section before the end of the clock gate, the first 10 stages of the counter 203 have reached a full count and wrapped around to begin counting again. When a full count is reached in stages 1–10, flip-flop 246 is set to partially enable the AND gate 268. The AND gate 268 is fully enabled by the logic 1 on the line 205, since the pen is at its low position. If, after stages 1–10 have wrapped around, a count of eight or more is realized, line 250 goes to a logic 1 which passes through the AND gate 268 to the increase instruction input of the register 242, whereby the count in the register 242 increments by one count thereby designating the next higher section. The change of state in the register 242 is recognized by the decoder 400 which causes the section switches 500 to switch to the next higher section.

It is desirable that the position designating count produced for a particular pen position during the sectioned mode of operation produce a corresponding count when the tablet is in its search mode of operation. It will be remembered that in order to have valid readings, each section must be operated within its linear range and to accomplish this, the time constant of the integrator 33 during the reference was altered to develop a specified experimentally determined δ time which represents a specific offset defined as the distance between the actual origin of the section and the modified origin, or the actual full scale point of the section and the modified full scale point. This offset can be considered as a percentage of the total section length. That is, a specific δ may have been determined to be 15 percent of the total section length. Since the time constant of the integrator is not changed when the tablet is operating in its search mode, the same offset is developed. However, this offset is a percentage of the entire length of the voltage divider element rather than merely the length of a section and thus, a much larger distance is represented by the time δ. Hence, a zero count in counter 203 during the search mode does not represent the point at the modified zero $A_0'$, but rather some distance farther away from $A_0'$ towards the high end of the element. To overcome this problem, resistors 510 and 512 are provided in the section switching network 500. These resistors provide an additional voltage drop required to compensate for the greater offset developed when the tablet is in the search mode as opposed to the sectioned mode.

While the invention has been particularly shown and described with reference to a preferred embodiment thereof, it will be understood by those skilled in the art that various changes in form and details may be made without departing from the spirit and scope of the invention.

What is claimed is:

1. In a position transducing system including a voltage distribution means for producing, in response to a drive voltage, a voltage varying as a function of position along said distribution means, and sensing means for sensing the potential along said distribution means, the improvement comprising; means for dividing said voltage distribution means into sections, said last-mentioned means comprising a plurality of taps coupled to the ends of said voltage distribution means and at least two other locations along the length of said voltage distribution means, and means for applying said drive voltage across selected sections of said voltage distribution means, said last-mentioned means for applying comprising control logic means producing a section designating signal and decoder means responsive to the section designating signal for activating said section switch means to apply the drive voltage across the pair of taps defining the section designated by the section designating signal, wherein each section of said voltage distribution means includes non-linear regions wherein the produced voltage varying as a function of position is a non-linear function of position, voltage measurements to be made only within the linear region of a section, bounded by what is termed the modified origin and modified full scale points of the section, the actual origin and full scale appliance of a section being bounded by the pair of taps associated therewith, the control logic including means responsive to the position varying voltage, for causing said sensing means to generate a signal representing a zero value of the position varying voltage when the voltage at the modified origin is sensed, wherein said sensing means comprises a dual slope type analog-digital converter, and switch means for applying said position varying voltage to said converter during a sample period and a reference voltage to said converter during a reference period, during which time the voltage stored in the converter during the sample period is decayed, at a rate determined by the value of the reference voltage, the ratio of the position varying voltage to the reference voltage being proportional to the ratio of the time, *t*, required for the voltage stored in the converter to decay to zero to the sample period T, wherein time *t* is proportional to the position varying voltage, said control logic including cycle control logic comprising:

a control counter, means for producing a sample period indicating signal indicating a first predetermined count in said control counter, corresponding to said sample period, means for detecting a second predetermined count $\delta$ representing an offset count defined as the count required for the voltage stored in the integrator to decay to zero at time $T + \delta$ and $2T + \delta$ when the position varying voltage represents the modified origin and the modified full scale points of a section respectively, and means responsive to the $\delta$ count detecting means for producing control counter reset signal resetting only those stages of the control counter necessary to store a count corresponding to the time of a sample period T.

2. The transducing system of claim 1 wherein said resetting means comprises first coincidence gate means responsive to said sample period indicating means and said $\delta$ count detecting means for producing a signal indicating coincidence between a sample period indicating signal and a $\delta$ count detection signal, $\delta$ latch means, responsive to said coincidence indicating signal, for producing a $\delta$ latch set signal and second coincidence gate means, responsive to said $\delta$ latch set signal and said coincidence indicating signal for producing said control counter reset signal.

3. The transducing system of claim 1 wherein said cycle control logic further includes means responsive to said reset signal and said sample period indicating means for initiating a clock gate, said sensing means further including zero crossing detector means for ending said clock gate when the position varying voltage stored in said integrator decays to zero.

4. The transducing system of claim 3 wherein said cycle control logic further comprises means for producing an overflow count responsive to said means for producing a sample period indicating signal, for producing a control counter reset signal a predetermined time after time T of a reference period has elapsed.

5. The transducing system of claim 3 further including voltage responsive pen means for applying the position varying voltage to said analog-digital converter means and wherein said control logic further includes section control logic comprising:

an N+*n* section counter including a number of stages *n* in excess of the number N required to store a count corresponding to time T, threshold logic means responsive to the distance of the pen means from the voltage distribution means for producing a search mode signal and a sectioned mode signal, means responsive to said search mode signal for applying clock pulses to the N high order stages of the section counter, and means responsive to said sectioned mode signal for applying clock pulses to the N low order stages of the section counter, said section switch means including means responsive to said search mode signal for applying said drive voltage across the entire length of said voltage distribution means.

6. The transducing system of claim 5 wherein said section control logic further includes register means for storing the count in the n high order stages of the section counter, said decoder means being responsive to the count in said register means to cause said section switch means to apply the drive voltage across the section designated by the *n* high order stages of the section counter, and means responsive to the end of said clock gate for causing the contents of the *n* high order stages of the section register to be loaded into said register means.

7. The transducing system of claim 6 wherein said section control logic further includes means responsive to said sectioned mode signal for decrementing the count stored in said register means when the count in the low order N stages of the section counter fails to reach a predetermined minimum count during a reference period and for incrementing the count stored in said register means when the count in the low order N stages of the section counter exceeds a predetermined count greater than a count corresponding to time T during a reference period.

8. The transducing system of claim 7 wherein said decrementing means comprises a single shot multivibrator responsive to the initiation of a clock gate, a decrementing flip-flop, the set input thereof being coupled to said single shot, means for resetting said flip-flop when the count in the low order N stages of the section counter exceeds said predetermined minimum count and decrementing coincidence gate means responsive to said sectioned mode signal, the end of said clock gate and said flip-flop for producing a decrement signal when the flip-flop is not reset at the end of the clock gate during the sectioned mode of operation, and said incrementing means comprises an incrementing flip-flop coupled to the N th stage of the low order N stages of the section counter, and incrementing coincidence gate means coupled to said incrementing flip-flop producing an incrementing signal, when after said incrementing flip-flop detects a count of N in the lower order N stages of the section counter, said predetermined count is detected during the sectioned mode of operation.

9. The transducing system of claim 8 wherein said section switch means comprises a plurality of electronic switch means equal to the number of sections the voltage distribution means is divided into and is responsive to section indicating signals produced by said decoder means for selectively connecting the drive voltage to a selected section, a further electronic switch means responsive to said search mode signal for applying said drive voltage across the entire voltage distribution means and offset voltage compensating means, operable when the drive voltage is applied across the entire length of the voltage distribution means for causing the count in said section counter to store the same count for a common point on said voltage distribution means when operating in either the search mode or the sectioned mode.

10. A position transducing system comprising:

a. a voltage distribution means having end taps and intermediate taps defining adjacent sectional parts of distribution means for producing, in response to a voltage applied to any pair of said taps, a distributed voltage which varies between said pair of taps as a function of position between said pair of taps, b. reference voltage producing means, c. sensor means movable in the vicinity of said voltage distribution means for sensing said distributed voltage most nearly adjacent the instantaneous position of said sensor means, d. mode control means for providing first and second mode control signals designating first and second mode operation, respectively, e. means responsive to said first mode control signal for applying said reference voltage between said end taps, f. section storage means for storing a value therein, g. means responsive to said first mode control signal and to said sensor means for deriving a value representative of the said section of said voltage distribution means which is most nearly adjacent the instantaneous position of said sensor means and for entering said value into said section storage means, and h. means responsive to said second mode control signal and to said section storage means for applying said reference voltage between the pair of said taps which define the said section designated by the value stored in said section storage means.

11. A position transducer as claimed in claim 10 further comprising means responsive to said second mode control signal and to said sensor for deriving a value representative of the position in said section to which said sensor is most nearly adjacent.

12. A position transducer as claimed in claim 11 further comprising means responsive to said second mode control signal and to the movement of said sensor between sections for altering the value stored in said section storage means to accurately represent the section said sensor is most nearly adjacent to during the existence of said second mode control signal.

13. A position transducer as claimed in claim 12 wherein the taps are positioned on said voltage distribution means so that there is a slight overlap between adjacent sections.

* * * * *